Patented Dec. 1, 1942

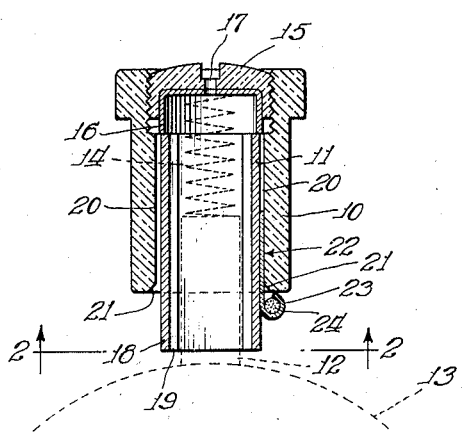
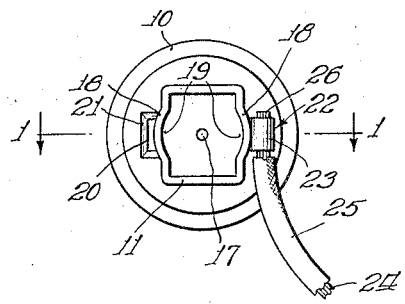
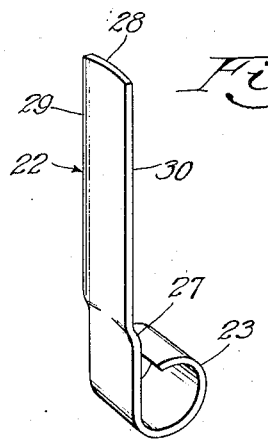

2,303,836

UNITED STATES PATENT OFFICE 2,303,836

BRUSH HOLDER WIRING MEANS

James Gordon, Chicago, Ill.

Application March 3, 1941, Serial No. 381,500

2 Claims. (Cl. 171—324)

This invention relates to brush holder wiring means for dynamoelectric machines.

Among other objects, the invention aims to provide simple and inexpensive means for providing an electrical connection with the brush of enhanced simplicity of construction and adaptability.

Other objects and advantages will be apparent from the following description, taken together with the accompanying drawing, in which—

Figure 1 is a longitudinal sectional view of a brush holder with my invention applied thereto;

Figure 2 is an end view taken on the line 2—2 of Fig. 1; and

Figure 3 is a perspective view of a member forming a part of my invention.

Referring in detail to the illustrative construction shown in the drawing, the jacket 10 is in the form of a sleeve of the usual insulating material such as a molded phenolic condensation product and carries telescoped therein a brush holding sleeve proper 11 desirably of metal such as brass or bronze, the latter sleeve being thus an electrical conductor.

It will be understood that the brush 12, which forms no part of the present invention, and which may be of carbon as is well known in the art, is slidably carried in the sleeve 11 and is held against the commutator 13 or the like as by a coil spring 14 retained by a screw cap 15 which is also desirably of phenolic condensation material and has an inner metallic cup-shape bearing 16 within which the spring 14 is abutted. An air vent 17 may occur at this point.

As shown in the drawing, the sleeve 11 upon two of its walls is desirably slightly bulged outwardly as at 18 to form a longitudinally extending transversely arcuate wall portion to provide air spaces as at 19 between the brush 12 and its sleeve 11, this portion being of less width transversely of the sleeve than its over-all dimension. In accordance with my invention, adjacent and receiving this arcuate wall I provide a shallow longitudinally extending channel 20 between the two sleeves 10 and 11 and in this instance in the jacket 10 and extending from its distal end, where the channel may be slightly chamfered as at 21, through the brush holding part proper of the jacket.

Further in accordance with the present invention, I provide a wiring member 22, shown enlarged in Fig. 3, which may comprise an initially flat strip of metal curled at its end as at 23 within which curl or loop may be readily soldered a suitable circuit wire 24 having the usual insulation covering 25, the end of which is bared as at 26 to be received in the loop 23, the member 22 being advantageously tinned so that soldering may be readily effected by dipping the parts into a solder bath before the wire 24 and wiring member 22 are connected with the brush.

Thereupon the member 22 may be slid into one of the channels 20, this fit being desirably snug so that a good frictional contact is established both with the sleeve 11 and the jacket 10. The elongated part between the longitudinal edges 29 and 30 of the member 22 may be forced into the channel 20 say as far as an offset 27 which may be advantageously formed on the wiring member 22, the chamfer 21 permitting ready entry of the member 22 into the channel 20, and the sliding frictional force fit effecting a good mechanical anchorage against accidental withdrawal, but permitting ready manual withdrawal when desired for any purpose.

As best shown in Fig. 3, a slight transverse curvature as at 28 is advantageously given to the member 22 at least say as far as the offset 27, the radius of which is preferably smaller than the radius of the bulge 18 of the sleeve 11 so that the edges 29 and 30 will cut in somewhat to the metal of the member 11 when the parts are assembled, as shown and described. Thus, both a good mechanical connection is established of the wire 24 to the brush holder, and also an advantageous scraping frictional electrical contact between the member 22 and the brush sleeve 11.

So constructed and arranged, I have shown a simple and efficient wiring device for a structure of the class described embodying an elongated strip of metal having one portion formed with a slight transverse curvature to effect a scraping contact at its longitudinal edges with another member by end to end sliding engagement and its other end bent on an axis transverse to said first mentioned portion to form a wire embracing soldering portion, together with a novel combination of this metal strip member with a pair of telescoping sleeves one of said sleeves being an electrical conductor, a shallow channel between the sleeves being adapted to receive the first mentioned portion of the metal strip member with a somewhat force fit to effect a scraping contact of the metal strip member at its longitudinal edges with the conductor sleeve by an end to end sliding engagement therewith.

Such changes may be made as are within the scope of the following claims without departing from the invention.

Having described my invention, I claim:

1. In a device of the class described for use with a pair of telescoping sleeves, one of said sleeves being an insulator and the other an electrical conductor, that improvement therein comprising a wiring member embodying a relatively narrow elongate strip of metal having one portion formed with a slight transverse curvature on an axis extending in the direction of the length of the strip and adapted to be received between said sleeves with a somewhat force fit, the other end of said member being bent in the form of a loop on an axis transverse to said first mentioned portion to form a somewhat cylindrical wire embracing soldering portion.

2. In a device of the class described for use with a pair of telescoping elements, one of said elements being an electrical conductor, that improvement therein comprising a wiring member embodying a relatively narrow elongate strip of metal having one portion formed with a slight transverse curvature on an axis extending in the direction of the length of the strip and adapted to be received between said elements with a somewhat force fit, the other end of said member being bent in the form of a loop on an axis transverse to said first mentioned portion to form a somewhat cylindrical wire embracing soldering portion, there being an offset formed between said portions to serve as a stop effective to limit such sliding engagement.

JAMES GORDON.